United States Patent [19]
Kitsuki et al.

[11] Patent Number: 5,331,584
[45] Date of Patent: Jul. 19, 1994

[54] DISCRETE COSINE TRANSFORMATION PROCESSOR

[75] Inventors: Toshiaki Kitsuki; Akira Sawada, both of Tokyo, Japan

[73] Assignee: NEC Corporation, Tokyo, Japan

[21] Appl. No.: 997,326

[22] Filed: Dec. 28, 1992

[30] Foreign Application Priority Data

Dec. 27, 1991 [JP] Japan ................................. 3-360287

[51] Int. Cl.$^5$ .............................................. G06F 7/38
[52] U.S. Cl. .................................................. 364/725
[58] Field of Search ................................ 364/725-727

[56] References Cited

U.S. PATENT DOCUMENTS

| | | | |
|---|---|---|---|
| 4,385,363 | 5/1983 | Widergren et al. | 364/725 |
| 4,510,578 | 4/1985 | Miyaguchi et al. | 364/725 |
| 4,899,300 | 2/1990 | Jutand et al. | 364/725 |

Primary Examiner—Tan V. Mai
Attorney, Agent, or Firm—Burns, Doane, Swecker & Mathis

[57] ABSTRACT

A discrete cosine transformation processor subjects a plurality of input data to addition or subtraction at an adder/subtracter with two combinations according to the control signal every clock pulse so as to output a plurality of combination data. The combination data are assigned to eight groups according to certain combinations and each of them is input to one of eight selection circuits. The selection circuit selects one data from the combination input data according to the control signal and outputs the selected data every clock pulse. A multiplier receives the data selected by the selection circuit and multiplies it by a predetermined coefficient every clock pulse. Further, a second adder/subtracter subjects the output data from the multiplier to addition or subtraction in different combinations according to the control signal to determine cosine transformation coefficient to inverse cosine transformation coefficients.

10 Claims, 10 Drawing Sheets

| | i=0 | 1 | 2 | 3 | 4 | 5 | 6 | 7 |
|---|---|---|---|---|---|---|---|---|
| u=0 | +P0 | +P0 | +P0 | +P0 | +P0 | +P0 | +P0 | +P0 |
| 1 | +P1 | +P3 | +P5 | +P7 | −P7 | −P5 | −P3 | −P1 |
| 2 | +P2 | +P6 | −P6 | −P2 | −P2 | −P6 | +P6 | +P2 |
| 3 | +P3 | −P7 | −P1 | −P5 | +P5 | +P1 | +P7 | −P3 |
| 4 | +P4 | −P4 | −P4 | +P4 | +P4 | −P4 | −P4 | +P4 |
| 5 | +P5 | −P1 | +P7 | +P3 | −P3 | −P7 | +P1 | −P5 |
| 6 | +P6 | −P2 | +P2 | −P6 | −P6 | +P2 | −P2 | +P6 |
| 7 | +P7 | −P5 | +P3 | −P1 | +P1 | −P3 | +P5 | −P7 |

$P0 = 1/2\sqrt{2}$ $Pk = \frac{1}{2} \cos\left(\frac{k\pi}{16}\right)$ $(k = 1, 2, \ldots, 7)$

FIG. 4A $$a0 = f0 + f7$$
$$a1 = f1 + f6$$
$$a2 = f2 + f6$$
$$a3 = f3 + f4$$
$$a4 = f0 - f7$$
$$a5 = f1 - f6$$
$$a6 = f2 - f5$$
$$a7 = f3 - f4$$

FIG. 4B $$\begin{bmatrix} F0 \\ F4 \\ F2 \\ F6 \\ F1 \\ F3 \\ F5 \\ F7 \end{bmatrix} = \begin{bmatrix} a0+a1+a3+a2 & 0 & 0 & 0 & 0 & 0 & 0 \\ a0-a1+a3-a2 & 0 & 0 & 0 & 0 & 0 & 0 \\ 0 & a0-a3 & a1-a2 & 0 & 0 & 0 & 0 \\ 0 & -a1+a2 & a0-a3 & 0 & 0 & 0 & 0 \\ 0 & 0 & 0 & a4 & a5 & a6 & a7 \\ 0 & 0 & 0 & -a6 & a4 & -a7 & -a5 \\ 0 & 0 & 0 & a5 & a7 & a4 & a6 \\ 0 & 0 & 0 & -a7 & a6 & -a5 & a4 \end{bmatrix} \begin{bmatrix} p4 \\ p2 \\ p6 \\ p1 \\ p3 \\ p5 \\ p7 \end{bmatrix}$$

FIG. 5A $$\begin{bmatrix} f0 \\ f1 \\ f2 \\ f3 \\ f4 \\ f5 \\ f6 \\ f7 \end{bmatrix} = \begin{bmatrix} F0+F4 & F2 & F6 & F1 & F3 & F5 & F7 \\ F0-F4 & -F6 & F2 & -F5 & F1 & -F7 & -F3 \\ F0-F4 & F6 & -F2 & -F3 & F7 & F1 & F5 \\ F0+F4 & -F2 & -F6 & -F7 & F5 & -F3 & F1 \\ F0+F4 & -F2 & -F6 & F7 & -F5 & F3 & -F1 \\ F0-F4 & F6 & -F2 & F3 & -F7 & -F1 & -F5 \\ F0-F4 & -F6 & F2 & F5 & -F1 & F7 & F3 \\ F0+F4 & F2 & F6 & -F1 & -F3 & -F5 & -F7 \end{bmatrix} \begin{bmatrix} p4 \\ p2 \\ p6 \\ p1 \\ p3 \\ p5 \\ p7 \end{bmatrix}$$

FIG. 5B $$\begin{aligned} a0 &= F0 \\ a1 &= F6 \\ a2 &= F2 \\ a8 &= F4 \\ a4 &= -F7 \\ a5 &= F1 \\ a6 &= -F5 \\ a7 &= F3 \end{aligned}$$

FIG. 5C $$\begin{bmatrix} f0 \\ f1 \\ f2 \\ f3 \\ f4 \\ f5 \\ f6 \\ f7 \end{bmatrix} = \begin{bmatrix} a0+a8 & a2 & a1 & a5 & a7 & -a6 & -a4 \\ a0-a8 & -a1 & a2 & a6 & a5 & a4 & -a7 \\ a0-a8 & a1 & -a2 & -a7 & -a4 & a5 & -a6 \\ a0+a8 & -a2 & -a1 & a4 & -a6 & -a7 & a5 \\ a0+a8 & -a2 & -a1 & -a4 & a6 & a7 & -a5 \\ a0-a8 & a1 & -a2 & a7 & a4 & -a5 & a6 \\ a0-a8 & -a1 & a2 & -a6 & -a5 & -a4 & a7 \\ a0+a8 & a2 & a1 & -a5 & -a7 & a6 & a4 \end{bmatrix} \begin{bmatrix} p4 \\ p2 \\ p6 \\ p1 \\ p3 \\ p5 \\ p7 \end{bmatrix}$$

DISCRETE COSINE TRANSFORMATION PROCESSOR

BACKGROUNDS OF THE INVENTION

1. Field of the Invention

The present invention relates to one-dimensional and two-dimensional discrete cosine transformation processor, and in particular relates to one-dimensional discrete cosine transformation processor whose block size in 8 sample and two-dimensional discrete cosine transformation processor whose block size is 8×8 sample.

2. Description of the Prior Art

Figure 7:
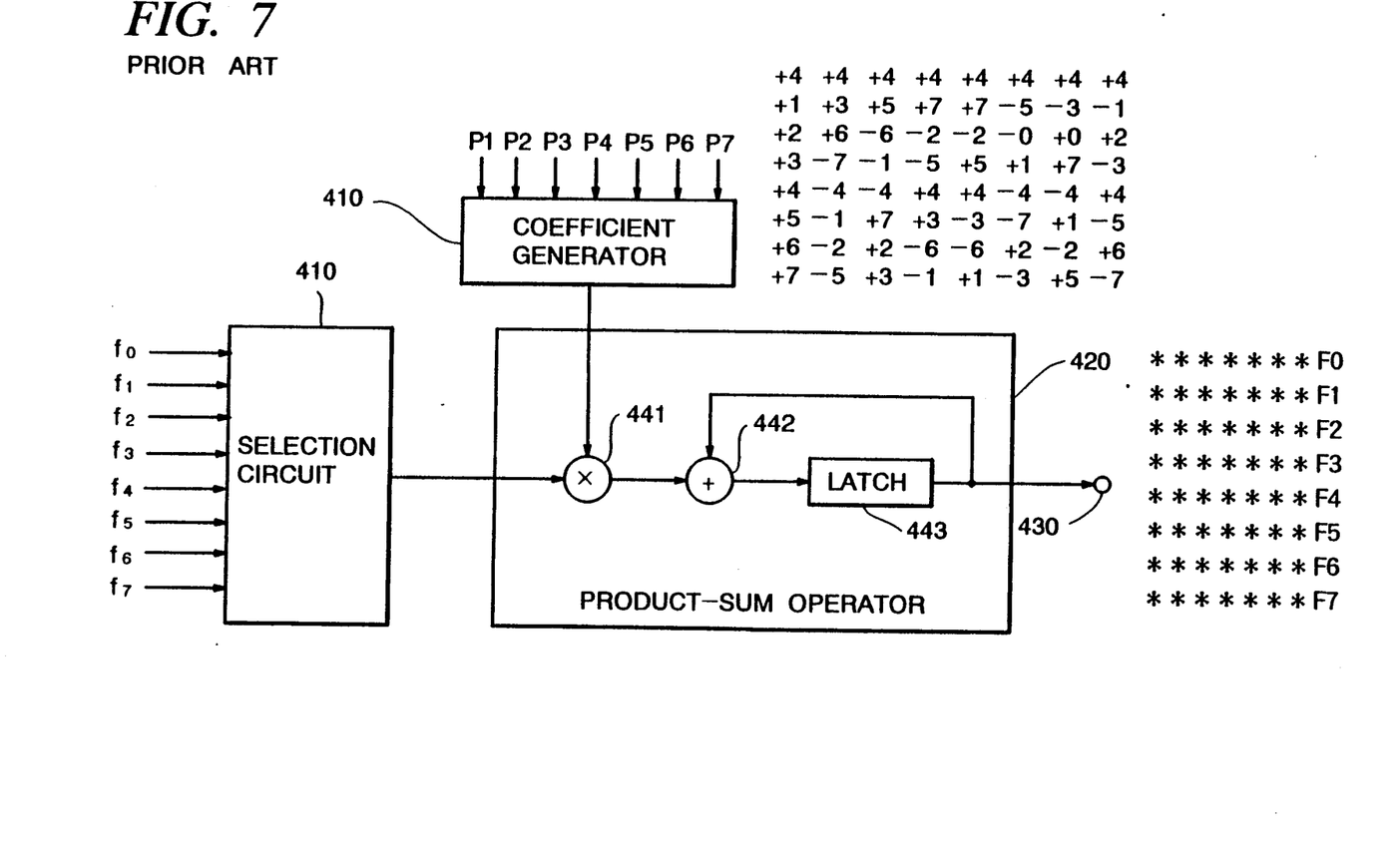
FIG. 7 is a block diagram to show the configuration of a conventional discrete cosine transformation processor.
Figure 8:
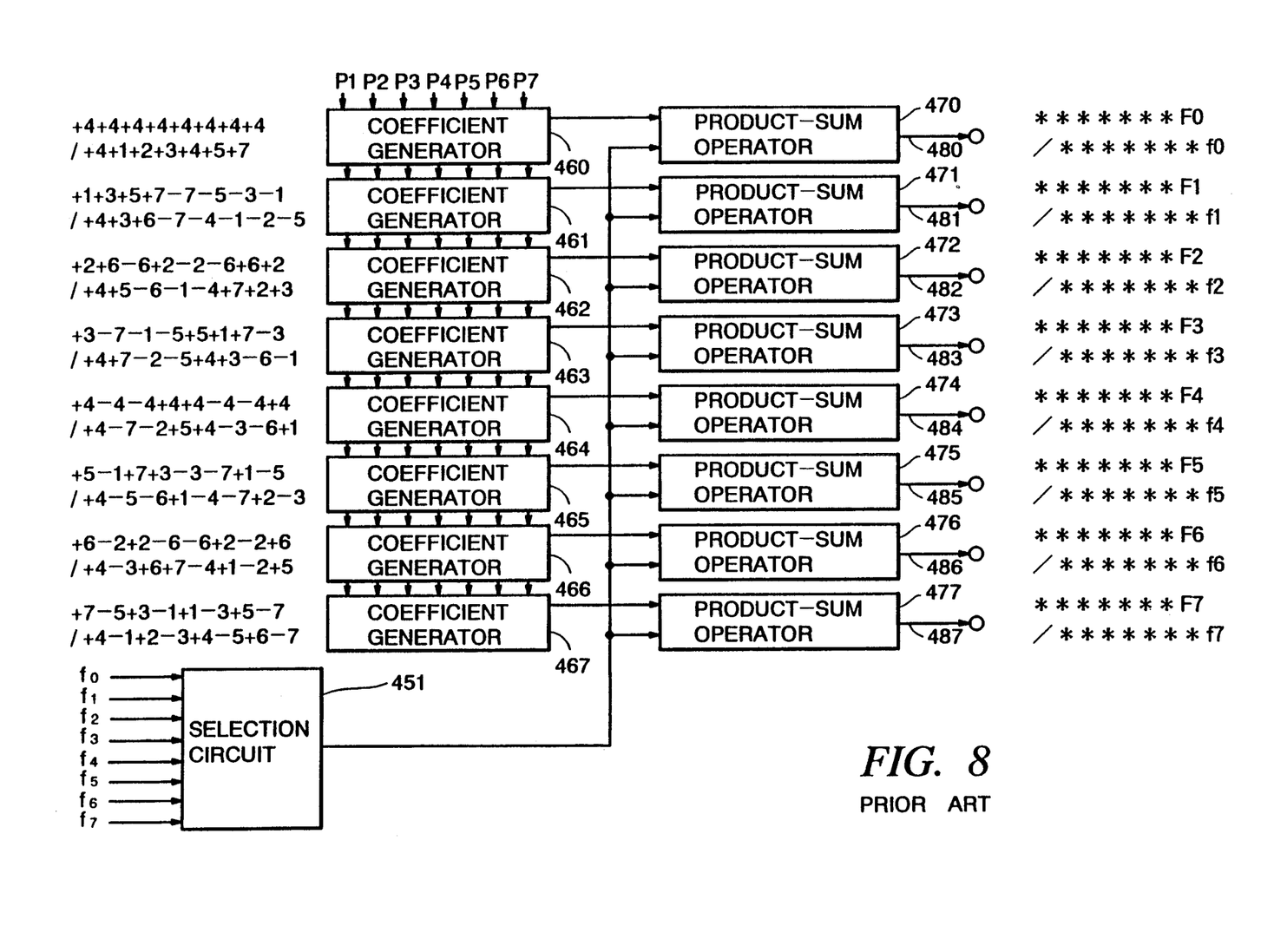
FIG. 8 is a block diagram to show the configuration of a conventional discrete cosine transformation processor.

Conventionally, digital signals for image data are coded with utilizing discrete cosine transformation. FIGS. 7 and 8 show examples of multiply-accumulate operators used in processors for the discrete cosine transformation.

FIG. 7 gives the configuration of a conventional discrete cosine transformation processor with a single product-sum operator. This discrete cosine transformation processor divides the input data into a plurality of blocks with several data so as to transform the blocks one by one. Suppose here that one block has eight data.

A discrete cosine transformation processor comprises a selection circuit 401, a coefficient generator 410, a multiply-accumulate operator 420 and an output terminal 430. The selection circuit 401 receives eight input data (f0 to f7) and supply them to the multiply-accumulate operator 420. The coefficient generator 410 adds a sign (+or −) to one of coefficients P1 to P7 before supplying it to the multiply-accumulate operator 420. Values given next to the coefficient generator 410 in the figure indicate coefficients with signs to be selected every clock. For example, "−4" means that "−P4" is to be output.

The multiply-accumulate operator 420 comprises a multiplier 441, an adder 442 and a latch circuit 443. To the multiplier 441, signals are supplied from the selection circuit 401 and the coefficient generator 410. The output of the multiplier 441 is sent to the adder 442, and the output of the adder 442 to the latch circuit 443. The output of the latch circuit 443 is provided to the adder 442 and the output terminal 430.

The operation of a conventional discrete cosine transformation processor with the configuration as above is now described briefly.

The selection circuit 401 supplies input data f0, f1, f2, f3, f4, f5, f6 and f7 in this order to the multiplier 441 with giving one data for each clock. The coefficient generator 410 selects one of the coefficients P1 to P7, adds a sign to it and sends it as a transformation coefficient to the multiplication device 441. The multiplier 441 calculates the product of the input data (one of f0–f7) and the transformation coefficient (one of P1–P7) and supplies it to the multiply-accumulate operator 420. At the multiply-accumulate operator 420, the signal from the multiplier 441 is accumulated with the adder 442 and the latch circuit 443 and sent to the output terminal 430. Thus, discrete cosine transformation coefficients F0 to F7 are in this order output from the output terminal 430 every eight clocks.

In the figure, "*" marks insignificant values on the way of calculation.

Inverse discrete cosine transformation operation is to determine a inverse cosine transformation coefficient (input data) based on a discrete cosine transformation coefficient. This inverse operation can be executed with the same procedure as in the above discrete cosine transformation operation except for the order of the coefficients selected at the coefficient generator 410.

The above discrete cosine transformation processor requires eight clocks for determination of a single discrete cosine transformation coefficient (one of F0 to F7). Thus, 64 clocks are required if eight discrete cosine transformation coefficients are to be determined.

FIG. 8 shows another conventional discrete cosine transformation processor with eight multiply-accumulate operators. This discrete cosine transformation processor comprises eight multiply-accumulate operators 470 to 477, eight coefficient generators 460 to 467 which supply transformation coefficients (P1 to P7) to the above multiply-accumulate operators 470 to 477, and a selection circuit 451 which supplies input data (f0 to f7) to the multiply-accumulate operators 470 to 477.

In the figure, the values given on the left of the coefficient generators 460 to 467 are coefficients with signs to be selected every clock. The values before the slashes are for ordinary discrete cosine transformation operation and those after the slashes are for inverse discrete cosine transformation operation. Meaning of the values themselves are the same as in the above discrete cosine transformation processor (FIG. 7).

With a discrete cosine transformation processor with the above configuration, eight pairs of coefficient generators 460 to 467 and multiply-accumulate 470 to 477 enable determination of eight discrete cosine transformation coefficients in eight clocks (one discrete cosine transformation coefficient in one clock), resulting in rapid processing at a speed eight times higher than that for the discrete cosine transformation processor in FIG. 7.

As described above, the conventional discrete cosine transformation processor as shown in FIG. 7 uses a single multiply-accumulate operator 420 for operation and requires as many as 64 clocks to process a single block (with eight coefficients). This slow processing speed is a drawback of this processor.

In case of a discrete cosine transformation processor as shown in FIG. 8, it certainly enables processing at a speed eight times higher than that for the processor in FIG. 7, but it requires a large amount of hardware devices. For example, when a processor using a single multiply-accumulate operator requires a circuit with 5,000 gates, this processor with eight times higher processing speed needs a circuit with 40,000 gates.

SUMMARY OF THE INVENTION

It is an object of the present invention to provide a discrete cosine transformation processor enabling high-speed determination of discrete cosine transformation coefficients with small scale hardware.

According to a preferred embodiment of the present invention to attain the above object, a discrete cosine transformation processor to determine discrete cosine transformation coefficients and inverse cosine transformation coefficients based on input data comprises a first addition/subtraction means to subject a plurality of input data arranged to certain combinations to addition or subtraction according to a first control signal every clock so as to output a plurality of combination input data, a plurality of selection means which receive the data from the first addition/subtraction means assigned to a plurality of groups according to certain combinations for data input group by group and output one of the combination input data according to a predetermined second control signal, a plurality of multiplication means which respectively receive a plurality of selected data selected by the selection means and multiply them by the predetermined coefficients, and a plurality of second addition/subtraction means which perform addition or subtraction according to a third control signal every clock using the data output from the multiplication means with different combinations so as to determine cosine transformation coefficients or inverse cosine transformation coefficients.

According to a further preferred embodiment of a discrete cosine transformation processor, each of the first, second and third control signals comprises two types of signals for cosine coefficient transformation and inverse cosine coefficient transformation and they are switchable for every clock.

According to another preferred embodiment of the present invention to attain the above object, a discrete cosine transformation processor to determine discrete cosine transformation coefficients and inverse cosine transformation coefficients based on input data comprises eight first addition/subtraction means which perform addition or subtraction of eight input data with two combinations every clock according to a first control signal so as to output nine combination input data, eight selection means which receive the data from the first addition/subtraction means assigned to eight groups according to certain combinations for data input group by group and select one of the combination input data every clock according to a predetermined second control signal for output, seven multiplication means which respectively receive the data selected at the selection means and multiply the selected data by a predetermined coefficient every clock, and five second addition/subtraction means which perform addition or subtraction according to a third control signal using the data output from the multiplication means with different combinations every clock so as to determine cosine transformation coefficients or inverse cosine transformation coefficients.

According to a further preferred embodiment of a discrete cosine transformation processor, three of the five second addition/subtraction means are used for cosine transformation and the remaining two are used for inverse cosine transformation.

According to a still further preferred embodiment of a discrete cosine transformation processor, the first control signal to specify addition or subtraction at the first addition/subtraction means, the second control signal for the selection signal and the third control signal to specify addition or subtraction at the second addition/subtraction means are given for each clock so that eight cosine transformation coefficients or inverse cosine coefficients can be determined.

According to another preferred embodiment of a discrete cosine transformation processor, each of the first, second and third control signals comprises two types of signals for cosine coefficient transformation and inverse cosine coefficient transformation and is switchable for every clock.

According to a still another preferred embodiment of the present invention to attain the above object, a discrete cosine transformation processor to determine discrete cosine transformation coefficients and inverse cosine transformation processor comprises eight first addition/subtraction means which perform addition or subtraction of eight input data with two combinations every clock according to a first control signal so as to output eight combination input data, eight selection means which receive the data from the first addition/subtraction means assigned to four groups according to certain combinations for data input group by group and select one of the combination input data every clock according to a predetermined second control signal for output, four multiplication means with two types of coefficients which respectively receive the data selected at the selection means and multiply the selected data every clock by a coefficient specified by a third control signal, and five second addition/subtraction means which perform addition or subtraction according to a fourth control signal using the data output from the multiplication means with different combinations every clock so as to determine cosine transformation coefficients or inverse cosine transformation coefficients.

According to a further preferred embodiment of a discrete cosine transformation processor, two of the four second addition/subtraction means are used for cosine transformation and the remaining two are used for inverse transformation.

According to a still further preferred embodiment of a discrete cosine transformation processor, the first control signal for the first addition/subtraction means, the second selection signal for the selection means, the third control signal to select either of the two coefficients at the predetermined coefficient multipliers and the fourth control signal to specify addition or subtraction at the addition/subtraction means are given for each clock so that eight cosine transformation coefficients or inverse cosine transformation coefficients can be determined.

According to another preferred embodiment of a discrete cosine transformation processor, each of the first, second, third and fourth control signals comprises two types of signals for cosine coefficient transformation and inverse cosine coefficient transformation and they are switchable for every clock.

Other objects, characteristics and effects of the present invention will be clarified in the detailed description below.

BRIEF DESCRIPTION OF THE DRAWINGS

FIG. 5A is a diagram to show a matrix representing the processing to determine inverse cosine transformation coefficients based on inputs of discrete cosine transformation coefficients;

FIG. 5B is a diagram to show the results of addition/subtraction prior to input of discrete cosine transformation coefficients to a selection circuit;

FIG. 5C is a diagram to show a matrix obtained by applying other data to the matrix of FIG. 5A;

DESCRIPTION OF THE PREFERRED EMBODIMENT

Referring not to the attached figures, preferred embodiments of the present invention will be described in details.

Given below are transformation formulae for discrete cosine transformation and inverse discrete cosine transformation. With the former transformation, a discrete cosine transformation coefficient Fu as output data is determined based on input data fi, which comprises digital data including image data; with the latter, input data fi (inverse cosine transformation coefficient) is determined based on a discrete cosine transformation coefficient Fu. Discrete cosine transformation $$Fu = \sum_{i=0}^{7} fi \cdot cm(i,u)$$

inverse cosine transformation $$fi = \sum_{u=0}^{7} Fu \cdot cm(i,u)$$

where cm (i,u) is a transformation coefficient and $$cm(i,u) = \frac{1}{2} c(u) \cos\left[ \frac{(2i + 1) \cdot u \cdot \pi}{16} \right]$$

$$c(u) = \frac{1}{\sqrt{2}} \ (u = 0) \qquad c(u) = 1 \ (u \neq 0)$$

Figure 3:
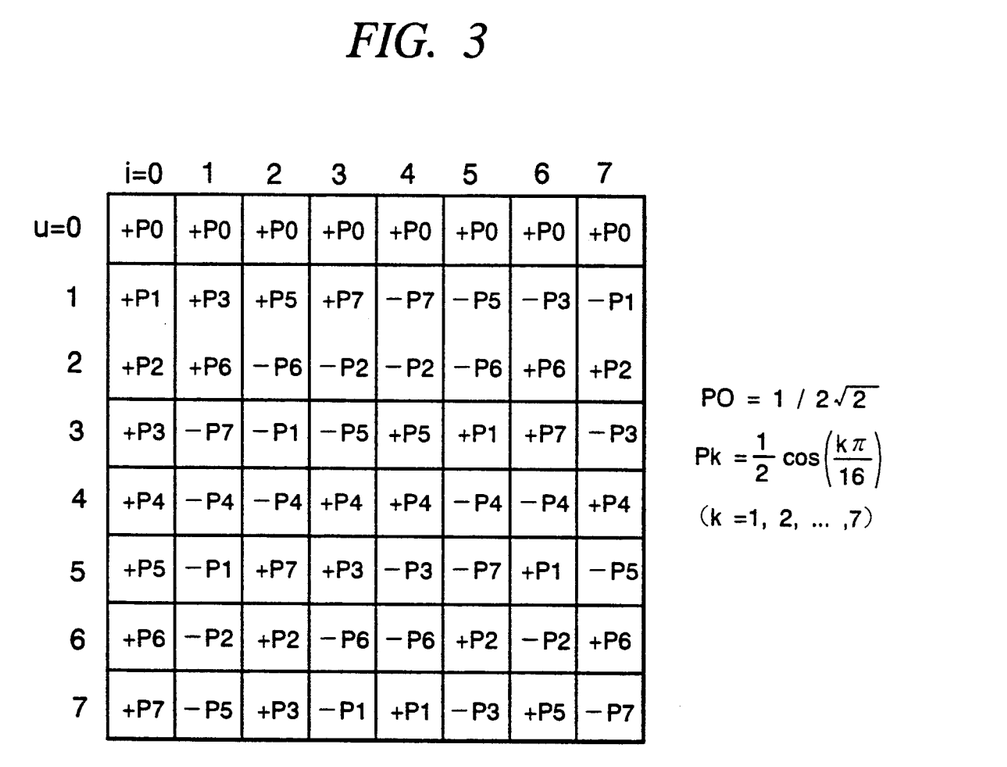
FIG. 3 is a diagram to show a variety of transformation coefficients used in discrete cosine transformation.

The transformation coefficient cm (i,u) can have one of the coefficient values P0 to P7 as shown in FIG. 3 according to the nature of the cosine function. Here, $$P0 = \frac{1}{2\sqrt{2}}$$

$$Pk = \frac{1}{2} c(u) \cos\left[ \frac{k\pi}{16} \right] (k = 1, 2, \ldots, 7)$$

Since P0=P4, here, there are 14 transformation coefficients (7 coefficients P0 to P7 for absolute values).

A discrete cosine transformation processor according to the present invention executes transformation based on the above transformation formulae.

Figure 1A:
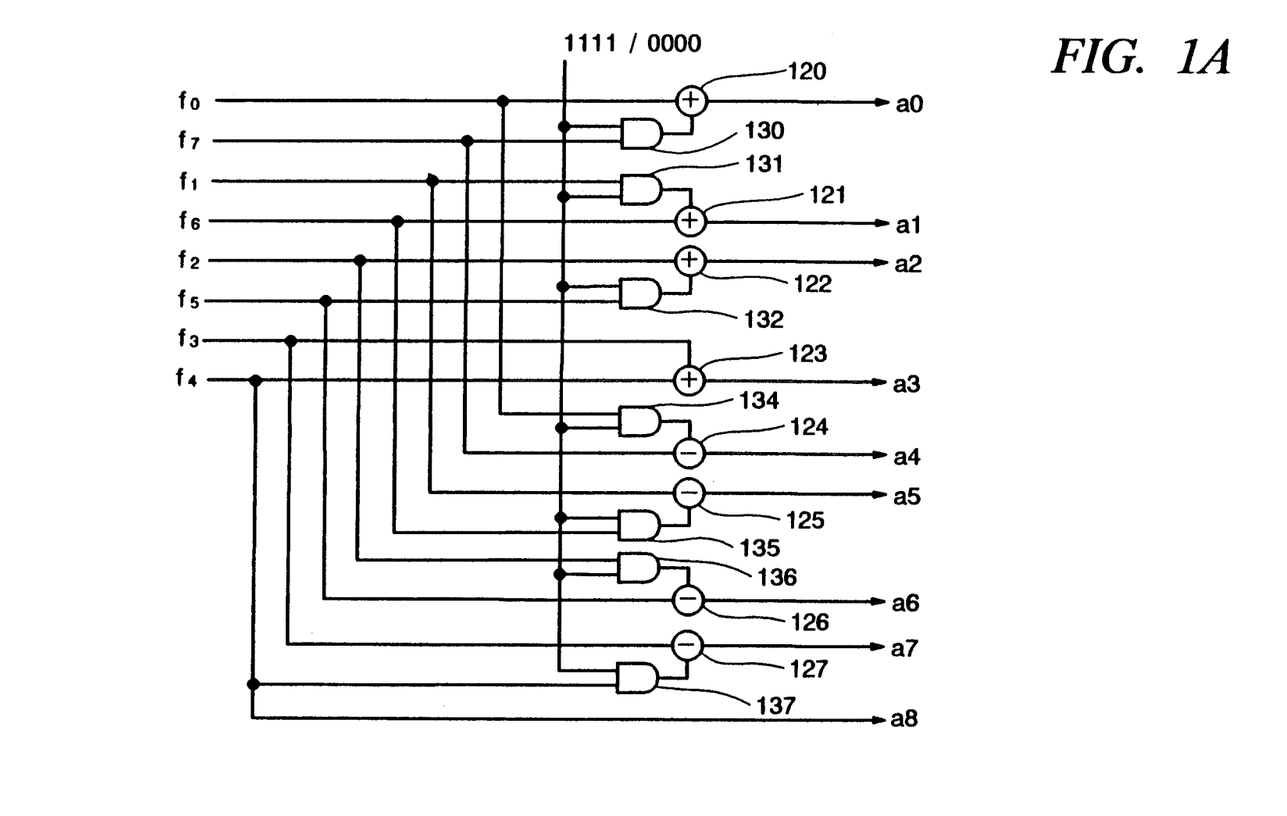
FIGS. 1A–1B are a block diagram to show the configuration of a discrete cosine transformation processor according to a first embodiment of the present invention.
Figure 1B:
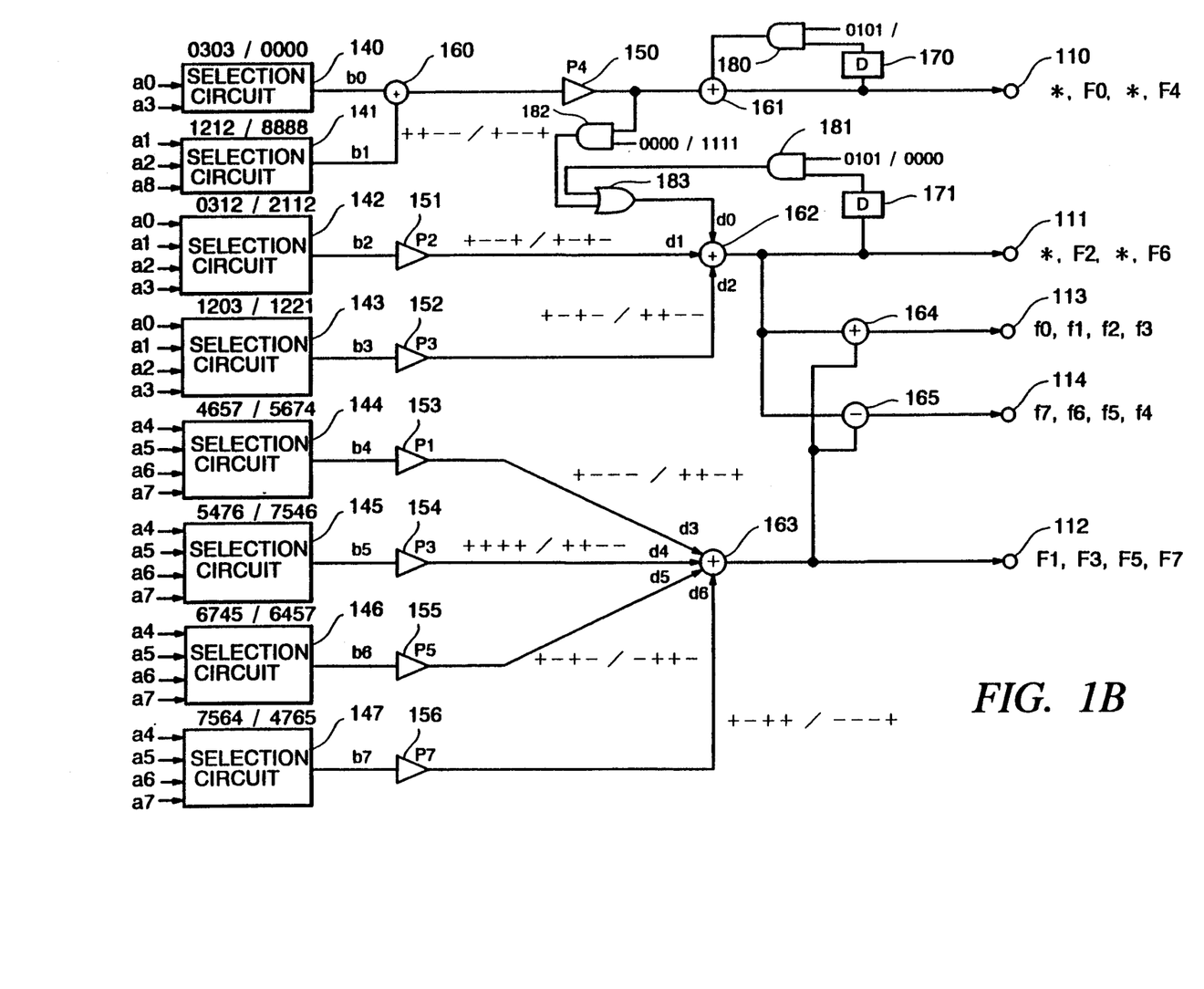

FIGS. 1A–1B show the configuration of a discrete cosine transformation processor according to a first embodiment of the present invention. The configuration and operation of this discrete cosine transformation processor are explained now.

Input data f0 to f7 are sent as follows: f0 is sent to an adder 120 and an AND gate 134, f1 to an subtracter 125 and an AND gate 131, f2 to an adder 122 and an AND gate 136, f3 to a subtracter 127 and an adder 123, f4 to an adder 123 and an AND gate 137, f5 to subtracter 126 and an AND gate 132, f6 to an adder 121 and an AND gate 135, f7 to subtracter 124 and an AND gate 130.

Each of the AND gates 130 to 137 receives, at the other input, a mask signal every clock. The mask signal switchable for each clock has 1, 1, 1, 1 for discrete cosine transformation and 0, 0, 0, 0 for inverse cosine transformation. In the figure, the values before "/" indicate mask signals for four clocks during discrete cosine transformation and those after "/" indicate mask signals for four clocks during reverse cosine transformation.

The adders 120 to 122 and the subtracters 124 to 127 are in charge of addition and subtraction using the input data f0 to f7 and the output data sent from the AND gates 130 to 137. When the mask signal has "1", These adders 120 to 122 and subtracters 124 to 127 output f0+f7, f1+f6, f2+f5, f0−f7, f1−f6, f2−f5, and f2−f4; when it has "0", they output f0, f6, f2, −f7, f1, −f5 and f3 respectively. The adder 123 always outputs f3+f4 resulting from addition of f3 and f4, regardless of the mask signal. For the sake of convenience, outputs from the adders 120 to 123 and the subtracters 124 to 127 are hereinafter referred to as combination input data a0 to a7, and the input data f4 is defined as a8.

Combination input data a8 and a0 to a7, which are output from the adders 120 to 123 and the subtracters 124 to 127 are assigned to a plurality of groups according to certain combinations as shown in the figure, and these groups are input to the selection circuits 140 to 147. Each of the selection circuits 140 to 147 selects, according to the applicable selection signal, one of the combination input data (a0 to a8) for output. The selection signals supplied to the selection circuits 140 to 147 specify the combination input data to be selected for each clock. For example, the selection circuit 140 receives as selection signals 0, 3, 0, 3 for discrete cosine transformation and 0, 0, 0, 0 for inverse cosine transformation. In the figure, the values above the selection circuits 140 to 147 indicate the contents of the selection signals. The outputs from the selection circuits 140 to 147 are referred to as b0 to b7 now. The data b0 is either of the data a0 or a3, the data b1 is one of the data a1, a2 and a8, the data b2 and b3 are respectively one of the data a0 to a3, and the data b4 to b7 are respectively one of the data a4 to a7.

To an adder/subtracter 160, the data b0 from the selection circuit 140, the data b1 from the selection circuit 141, and an addition/subtraction selection signal are supplied. The addition/subtraction selection signal may have "+"for addition or "−"for subtraction. As shown in the figure, it changes the value for each clock: "+", "+", "−"and then "−"for discrete cosine transformation and "+", "−", "−"and then "+"for inverse discrete cosine transformation. The adder/subtracter 160 calculates b0+b1 or b0−b1 according to the addition/subtraction selection signal and outputs the result to a multiplication device 150. The multiplier 150 multiplies the data sent from the adder/subtracter 160 by the transformation coefficient P4. Specifically, according to the data output from the adder/subtracter 160, the multiplier 150 calculates and outputs (b0+b1)×P4 or (b0−b1)×P4.

An adder 161 sums the data from the multiplier 150 and the data from an AND gate 180, and outputs the result to an output terminal 110 and a delay circuit 170. The delay circuit 170 delays the data from the adder 161 by one clock. The AND gate 180 receives the data from the delay circuit 170 and a mask signal (0101) and outputs the data from the delay circuit 170 as it is to the adder 161 when the mask signal is 1 and outputs 0 to the adder 161 when the mask signal is 0. In other words, the mask signal "0" causes the data from the multiplier 150 to be supplied as it is to the output terminal 110, and the mask signal "1" causes the data from the multiplier 150 to be accumulated before sending to the output terminal 110.

A multiplier 151 multiplies the data b2 from the selection circuit 142 by the transformation coefficient P2 and outputs the result (d1) of P2×b2 to an adder/subtracter 162. A multiplier 152 multiplies the data b3 from the selection circuit 143 by the transformation coefficient P6 and outputs the result (d2) of P6×b3 to the adder/subtracter 162. The adder/subtracter 162 in addition receives the data d0 from an OR gate 183 and an addition/subtraction selection signal. According to the addition/subtraction selection signal, the adder/subtracter 162 performs addition or subtraction using the data d1 (P2×b2) from the multiplier 151 and the data d2 (P6×b3) from the multiplier 152 and adds the data from the OR gate 183 to the result for output.

The delay circuit 171 supplies the data from the adder/subtracter 162 to the AND gate 181 with a delay of one clock. The AND gate 181 receives the data from the delay circuit 171 and the mask signal (1010/0000). It outputs the data from the delay circuit 171 as it is to the OR gate 183 when the mask signal is 1 and outputs 0 to the OR gate 183 when the mask signal has 0. The AND gate 182 receives the data from the multiplier 150 and the mask signal (0000/1111). It outputs the data from the multiplier 150 as it is to the OR gate 183 when the mask signal is 1, and outputs 0 to the OR gate 183 when the mask signal is 0.

The two mask signals supplied to the AND gates 181 and 182 do not have "1" at the same time. In other words, if either of the mask signals is 1, the other is always 0. The OR gate 183 is designed to output one of the following three data to the adder/subtracter 162: data from the delay circuit 171 sent via the AND gate 181, data from the multiplier 150 sent via the AND gate 182, and "0". Specifically, the adder/subtracter 162 outputs, to an output terminal 111, an adder 164 and a subtracter 165, the data as a result of addition or subtraction of output from the multiplier 151 and that from the multiplier 152, the data obtained by adding the output from the multiplication device 150 to the result of addition or subtraction of the outputs from the multipliers 151 and 152, or the data obtained accumulating the result of addition or subtraction using the output from the multiplier 151.

The multiplier 153 multiplies the data b4 from the selection circuit 144 by the transformation coefficient P1 and outputs the result b4×P1 (d3) to the adder/subtracter 163. The multiplier 154 multiplies the data b5 from the selection circuit 145 by the transformation coefficient P3 and outputs the result b5×P3 (d4) to the adder/subtracter 163. The multiplier 155 multiplies the data b6 from the selection circuit 146 by the transformation coefficient P5 and outputs the result b6×P5 (d5) to the adder/subtracter 163. The multiplier 156 multiplies the data b7 from the selection circuit 147 by the transformation coefficient P7 and outputs the result b7×P7 (d6) to the adder/subtracter 163.

The adder/subtracter 163 receives the data d3 (b4×P1) from the multiplier 153, the data d4 (b5 ×P3) from the multiplier 154, the data d5 (b6×P5) from the multiplier 155, the data d6 (b7×P7) from the multiplier 156 and the addition/subtraction selection signals for these data. The results of addition or subtraction according to the addition/subtraction selection signals are output to the output terminal 112, the adder 164 and the subtracter 165.

The adder 164 outputs the result of addition using the data from the adder 162 and the data from the adder 163 to the output terminal 113.

The subtracter 165 outputs the result obtained by subtracting the data of the adder 163 from the data of the adder 162 to the output terminal 114.

In the figure, the values indicated above the eight selection circuits 140 to 147 are selection signals. They indicate the additional characters of the data to be selected for four clocks. For each of them, the four values before the slash are additional characters of the data (a0 to a8) selected in discrete cosine transformation and those after the slash are additional characters of the data (a0 to a8) selected in inverse cosine transformation.

The symbols + and − at the terminals of the adder/subtracters 160, 162 and 163 are addition/subtraction selection signals indicating whether the input data are subjected to addition or subtraction during a period of four clocks. The four symbols before the slash are for discrete cosine transformation and four after the slash are for inverse discrete cosine transformation.

The value given at one of the inputs at the AND gate 180, 181 or 182 indicates the value of one-bit control signal input every clock during a four-clock period. The four values before the slash are for discrete cosine transformation and the four after the slash are for inverse cosine transformation.

The data names given at the output terminals 110 to 114 indicate the data output for each of the clocks during a four-clock period. The data F0 to F7 at the output terminals 110 to 112 indicate the discrete cosine transformation coefficients, and the data f0 to f7 at the output terminals 113 and 114 indicate the input data (inverse cosine transformation coefficients) obtained by inverse cosine transformation of the output data F0 to F7. The symbol "*" marks insignificant values on the way of calculation. For the data output from the output terminals 110 to 112, a circuit to take out data (a latch circuit or other) is provided where, for example, the clocks are counted to determine the timing when a certain data is output.

Figure 2A:
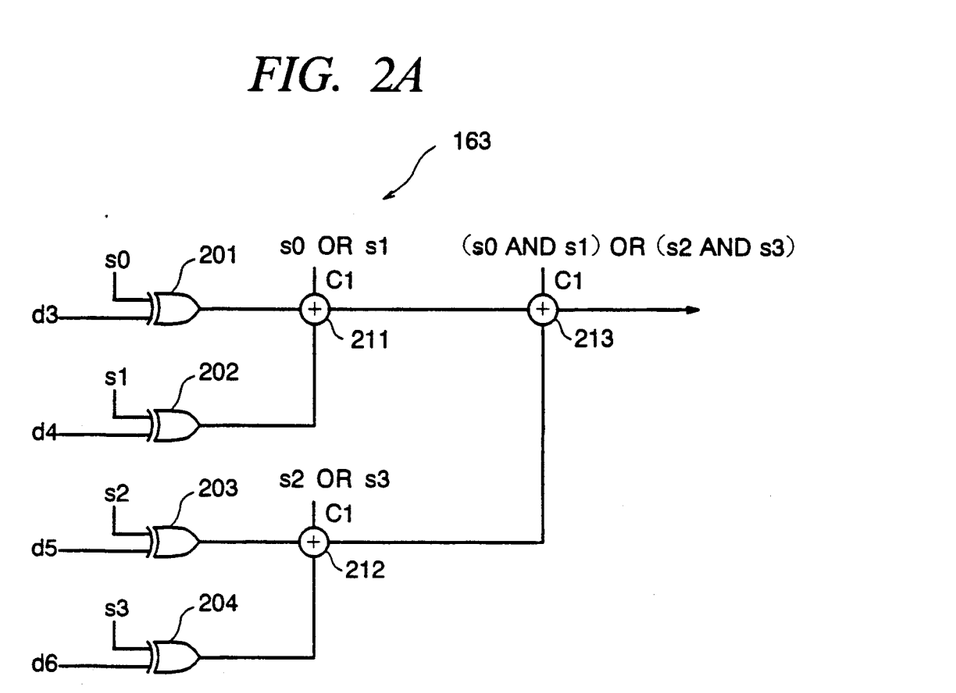
FIG. 2A is a logic circuit diagram for a four-input adder-subtracter used in FIG. 1.
Figure 2B:
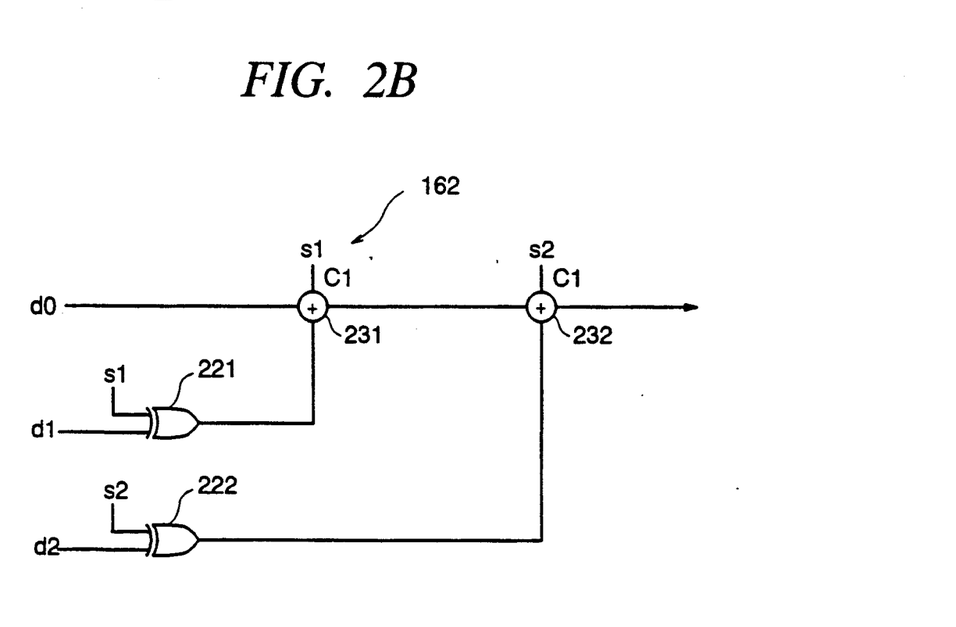
FIG. 2B is a logic circuit diagram for a three-input adder-subtracter used in FIG. 1.

FIGS. 2A and 2B show detailed block diagrams for the four-input adder/subtracter 163 and the three-input adder/subtracter 162 as described above.

Referring first to FIG. 2A, the configuration of the adder/subtracter 163 is described. The adder/subtracter 163 receives the four input data d0 to d3 output from the multipliers 153 to 156 and the addition/subtraction selection signals S0 to S3 to instruct addition or subtraction for the input data d0 to d3. S0 changes the symbol for each clock as +−−−/++−+. S1 changes as ++++, S2 as +−+− and S3 as +−++. Suppose here that addition is performed when the selection signal is 0 and subtraction is executed when the selection signal is 1. The adder/subtracter 163 is designed so that all of the data d0 to d3 are not subjected to subtraction or all of the addition/subtraction signals S0 to S3 do not become 1 at the same time.

The input data d0 to d3 are input to the exclusive-OR gates (EXOR gates) 201 to 204. The EXOR gate 201 receives the data d0 and its addition/subtraction selection signal S0 for that data. It sends d0 as it is to the adder 211 when S0 has 0 and provides "−d0−1" obtained from bit reversing of d0 to the adder 211 when the selection signal S0 is 1.

The EXOR gate 202 receives the data d1 and an addition/subtraction selection signal S1. It sends d1 as it is when S1 has 0 and provides "−d−1" obtained from bit reversing of d1 to the adder 211 when the selection signal S1 is 1.

The EXOR gate 203 receives the data d2 and an addition/subtraction selection signal S2. It sends d2 as it is to the adder 212 when S2 has 0 and provides "−d2−1" obtained from bit reversing of d2 to the adder 211 when the selection signal S2 is 1.

The EXOR gate 204 receives the data d3 and an addition/subtraction selection signal S3. It sends d3 as it is to the adder 212 when S3 has 0 and provides "−d3−1" obtained from bit reversing of d3 to the adder 211 when the selection signal S3 is 1.

The adder 211 receives the data from the EXOR gate 201, the data from the EXOR gate 202, and the logical sum of the selection signals S0 and S1 as a carry-in signal. The adder 211 provides the sum of the data from the EXOR gate 201 and the data from the EXOR gate 202 when the carry-in signal (S0 or S1) is 0, and adds 1 to the sum of the data from the EXOR gate 201 and the data from the EXOR gate 202 when the carry-in signal is 1. AS a result, one of "d0+d1", "d0−d1" "−d0+d1" and "−d0−d1−1" is obtained according to S0 and S1, and sent to the adder 213.

As with the adder 211, the adder 212 receives the data from the EXOR gate 203, the data from the EXOR gate 204 and the logical sum of S2 and S3 (S2 or S3) as a carry-in signal. According to the selection signals S2 and S3, one of "d2+d3" "d2−d3"·"−d2+d3 and "−d2−d3−1 is obtained and sent to the adder 213.

The adder 213 receives the data from the adder 211, the data from the adder 212 and, as a carry-in signal, the logical sum of the logical product of SO and S1 (S0 and S1) and the logical product of S2 and S3 (S2 and S3), which is (S0 and S1) or (S2 and S3). The adder 213 provides the sum of the data from the adder 211 and the data from the adder 212 when the carry-in signal is 0, and adds 1 to the sum of the data from the adder 211 and the data from the adder 212 when the carry in signal is 1.

Since all of the selection signals S0 to S3 do not have 1 at the same time, "−d0−d1−1" and "−d2−d3−1" are not input at the same time. Therefore, the carry-in signal becomes 1 only when the logical product (S0 and S1) is 1 (the data from the adder 211 is "−d0−d1−1") or the logical product (S2 and S3) is 1 (the data from the adder 212 is "−d2−d3−1"). Here, the adder 213 adds 1 to the sum of the data from the adders 211 and 212 according to the carry-in signal and thereby provides a result equivalent to addition of "−d0−d1" or "−d2−d3".

Referring now to FIG. 2B, the adder/subtracter 162 receives the three data d0 to d2 sent from the OR gate 183 and the multipliers 151 and 152. Among them, the data d0 can be used for addition only and the data d1 and d2 can be used for both addition and subtraction. The input data d1 and d2 are input to the EXOR gates 221 and 222 respectively. The EXOR gate 221 receives the data d1 and an addition/subtraction selection signal S1 for that data. It outputs the data d1 as it is to the adder 231 when the selection signal S1 is 0 and outputs "−d0−1" obtained from bit reversing of d1 to the adder 231 when the selection signal S1 is 1.

The adder 231 receives the input data d0, the data from the EXOR gate 221, and the selection signal S1 as a carry-in signal. It provides the sum of the input data d0 and the data d1 from the EXOR gate 221 ("d0+d1") when the carry-in signal S1 is 0 and adds 1 to the sum of the input data d0 and the data "−d1−1" from the EXOR gate 221 ("−d0−d1") when the carry in signal S1 is 1. Then, the calculated data is output to the adder 232.

The EXOR gate 222 receives the data d2 and the addition/subtraction selection signal S2. It outputs the data d2 as it is to the adder 232 when the selection signal S2 is 0 and provides "−d2−1" obtained from bit reversing of d2 to the adder 232 when the selection signal S2 is·1.

The adder 232 receives the data from the adder 231, the data from the EXOR gate 222 and S2 as the carry-in signal. The adder 232 outputs the sum of the data from the adder 231 ("d0+d1" or "d0−d1") and the data d2 from the EXOR gate 221 when the carry-in signal S2 is 0. When the carry-in signal S2 is 1, it outputs the sum of the data from the adder 231 and the data "−d2−1" from the EXOR gate 222 plus 1, or in other words, the value obtained by subtracting d2 form the data sent from the adder 231 ("d0+d1" or "d0−d1").

Thus, this embodiment with much simpler configuration than the hardware configuration shown in FIG. 8 provides simultaneous operation of the operators (adder/subtracters and multipliers) and thereby enables determination of eight discrete cosine transformation coefficients (F0 to F7) or reverse discrete cosine transformation coefficients (f0 to f7) in a four-clock period.

Though eight selection circuits 140 to 147 are used in this embodiment, it is to be understood that the present invention is not limited to such a configuration.

Figure 4A:
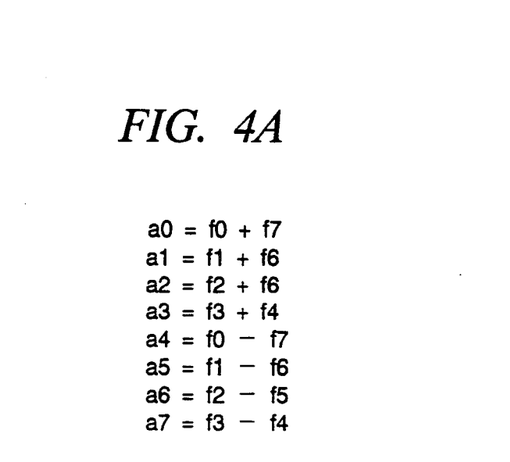
FIG. 4A is a diagram to show the results of addition/subtraction prior to data input to a selection circuit.
Figure 4B:
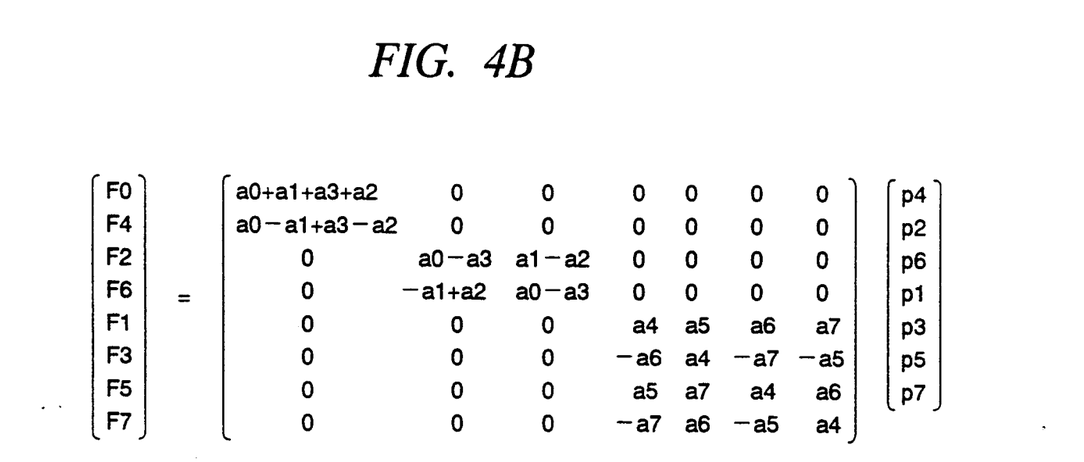
FIG. 4B is a diagram to show a matrix representing the processing to determine discrete cosine transformation coefficients.

FIGS. 4 and 5 show the operation executed by the discrete cosine transformation processor according to this embodiment. FIG. 4A shows the contents of data a0 to a7 output from the adders 120 to 123 and the subtracters 124 to 127. FIG. 4B shows a matrix representing the contents of operation where the data a0 to a7 selected at the selection circuits 140 to 147 are output as the discrete cosine transformation coefficients F0 to F7. This matrix can be obtained by arranging the discrete cosine transformation formulae given above using the transformation coefficients P1 to P7.

FIG. 5A shows a matrix representing the contents of operation where the inverse discrete cosine transformation coefficients f0 to f7 as input data are determined based on the discrete cosine transformation coefficients F0 to F7. FIG. 5B shows the contents of data a0 to a2 and a4 to a8 when the discrete cosine transformation coefficients F0 to F7 are input. FIG. 5C is a matrix obtained by application of the data a0 to a8 selected at the selection circuits 140 to 147 to the matrix shown in FIG. 5A.

Figure 6A:
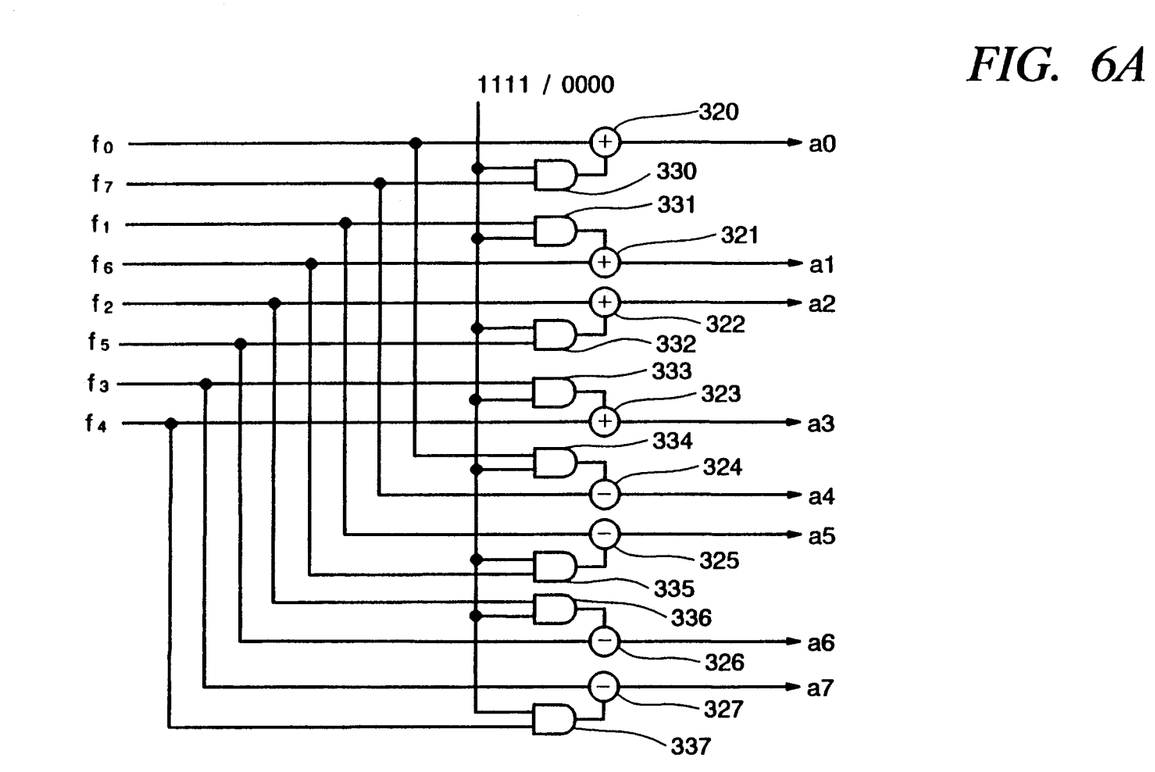
FIGS. 6A–6B are a block diagram to show the configuration of a discrete cosine transformation processor according to a second embodiment of the present invention.
Figure 6B:
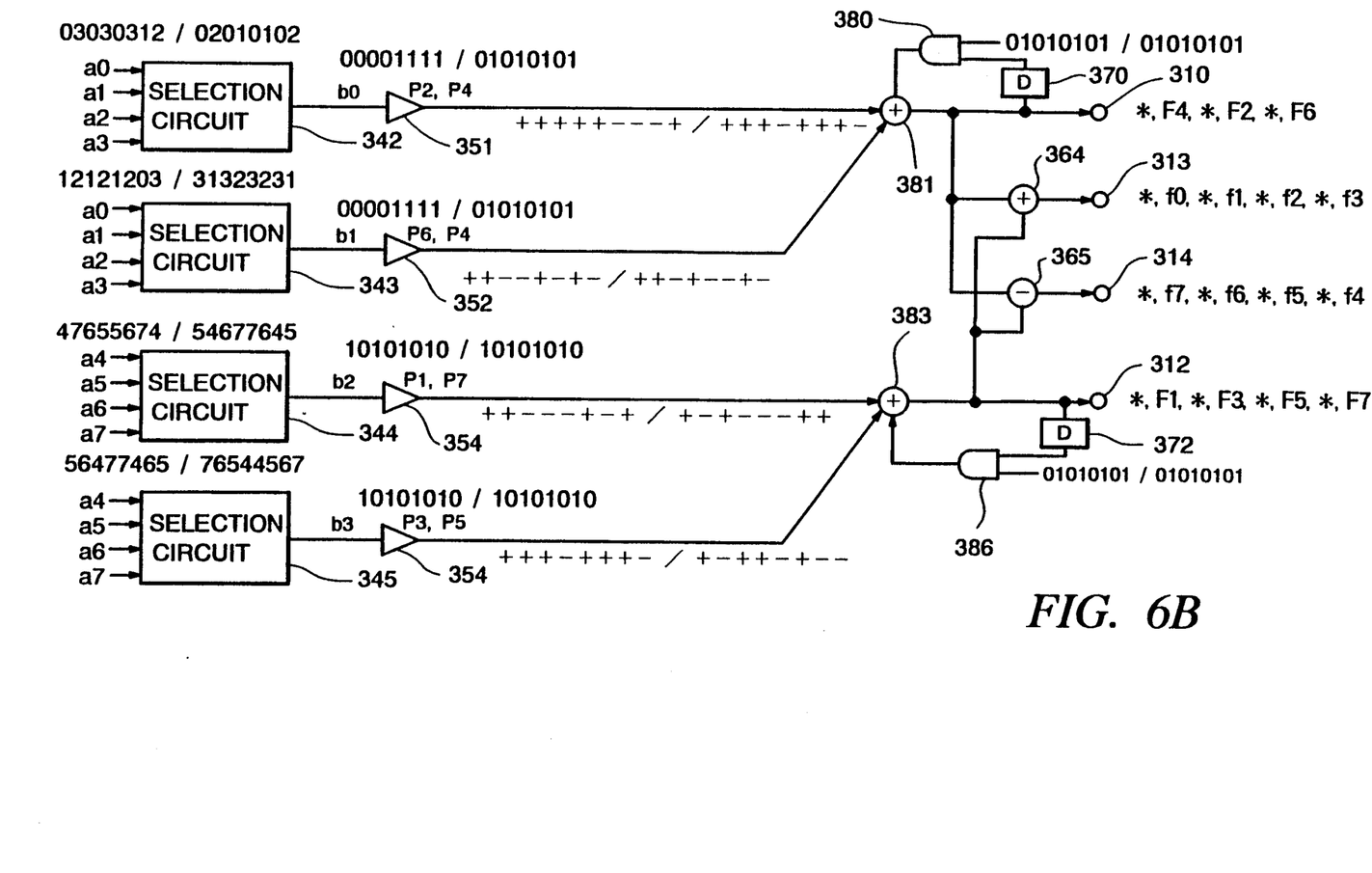

FIGS. 6A-6B shows the configuration of a discrete cosine transformation processor according to a second embodiment of the present invention. This discrete cosine transformation processor comprises AND gates 330 to 332 and 334 to 337, adders 320 to 323, subtracters 324 to 327 with the same configuration as the AND gates 130 to 137, the adders 120 to 123, and the subtracters 124 to 127 in the first embodiment, and description for them is omitted. In this embodiment, the processor is further provided with an AND gate 333 which receives an input data f3 and a mask signal and sends the output to the adder 323. The data a8 shown in FIG. 1B is omitted here. From the adders 320 to 323 and the subtracters 324 to 327, combination input data a0 to a7 are output. Mask signals are supplied for each of the eight clocks.

Selection circuits 342 and 343 receive the data a0 to a3 output from the adders 320 to 323 and the selection signals for eight clocks, and outputs one of the data a0 to a3 according to the specification by the selection signal. The selection circuits 344 and 345 receive the data a4 to a7 output from the subtracters 324 to 327 and the selection signals for eight clocks, and outputs one of the data a4 to a7 according to the specification by the selection signal. The outputs from the selection circuits 342 to 345 are defined here as b0 to b3.

The multiplier 351 receives the data b0 from the selection circuit 342 and a multiplier selection signal (00001111/01010101) for every clock. The multiplier 351 outputs the value obtained by multiplying the data b0 by the transformation coefficient P4 (b0×P4) when the multiplier selection signal is 0 and the value obtained by multiplying the data b0 by the transformation coefficient P2 (b0×P2) when the multiplier selection signal is 1, to the adder/subtracter 361. The multiplier 352 receives the data b1 from the selection circuit 343 and the multiplier selection signal (00001111/01010101). The multiplier 352 outputs the value obtained by multiplying the data b1 by the transformation coefficient P4 (b1×P4) when the multiplier selection signal is 0 and the value obtained by multiplying the data b1 by the transformation coefficient P6 (b1×P6) when the multiplier selection signal is 1 to the adder/subtracter 361.

The adder/subtracter 361 receives the data from the multiplier 351, the data from the multiplier 352, an addition/subtraction selection signal and the data from the AND gate 380. The adder/subtracter 361 adds the data obtained by addition or subtraction of the data from the multipliers 351 and 352 according to the addition/subtraction selection signal to the data from the AND gate 380 and output the result to the output terminal 310 and the delay circuit 370. The delay circuit 370 delays the data from the adder/subtracter 361 by one clock. The AND gate 380 receives the data from the delay circuit 370 and a mask signal. It outputs the data supplied from the delay circuit 370 as it is to the adder/subtracter 361 when the mask signal is 1 and outputs 0 to the adder/subtracter 361 when the mask signal is 0. In other words, when the mask signal is 0, the data obtained by addition or subtraction of the data from the multipliers 351 and 352 is supplied to the output terminal 310 and when the mask signal is 1, the data obtained by addition or subtraction of the data from the multipliers 351 and 352 is accumulated before sent to the output terminal 310.

The multiplier 353 receives the data b2 from the selection circuit 344 and a multiplier selection signal. The multiplier 353 outputs to the adder/subtracter 363 the product of the data b2 and the transformation coefficient P7 (b2×P7) when the multiplier selection signal is 0, and the product of the data b2 and the transformation coefficient P1 (b2×P1) when the multiplier selection signal is 1. The multiplier 354 receives the data b3 from the selection circuit 345 and a multiplier selection signal. The multiplier 354 outputs to the adder/subtracter 363 the product of the data b3 and the transformation coefficient P5 (b3×P5) when the multiplier selection signal is 0 and the product of the data b3 and the transformation coefficient P3 (b3×P3) when the multiplier selection signal is 1.

The adder/subtracter 363 receives the data from the multiplier 353, the data from the multiplier device 354, an addition/subtraction selection signal and the data from the AND gate 384. The adder/subtracter 363 performs addition or subtraction according to the addition/subtraction selection signal using the data from the multiplier 353 and the data from the multiplication device 354 and adds the result to the data from the AND gate 384 and outputs the sum to the output terminal 312 and the delay circuit 372. The delay circuit 372 delays the data from the adder/subtracter 363 for one clock. The AND gate 384 receives the data from the delay circuit 372 and a mask signal. It outputs the data from the delay circuit 372 as it is to the adder/subtracter 363 when the mask signal is 1, and outputs 0 to the adder/subtracter 363 when the mask signal is 0. In other words, when the mask signal is 0, the data from the multiplier 353 and the data from the multiplier 354 are subjected to addition or subtraction and the result is output to the output terminal 312, and when the mask signal is 1, the data obtained from addition or subtraction of the data from the multiplier 353 and the data from the multiplication device 354 is accumulated and then sent to the output terminal 312.

The adder 364 outputs the result of addition of the data from the adder 361 and the data from the adder 363 to the output terminal 313.

The subtracter 365 outputs the result of subtraction of the data at the adder 363 from the data at the adder 361 to the output terminal 314.

Thus, as shown in the figure, the output terminals 310 and 312 provide one of discrete cosine transformation coefficients F0 to F7 for every two clocks. The output terminals 313 and 314 provide one of inverse discrete transformation coefficients f0 to f7 for every two clocks. The symbol "*" in the figure marks insignificant values on the way of calculation. The data output from the output terminals 310 to 314 are taken out by a circuit (latch circuit or other) which, for example, counts the clocks to know the timing when a certain data is output.

In FIG. 6A-6B, the values shown above the four selection circuits 342 to 345 are selection signals, each of which represents a character for i in the data ai (i=0, 1, 2, 3, 4, 5, 6 or 7) selected for each clock during an eight-clock period. The eight values before the slash represent the characters for data selected in discrete cosine transformation and those after the slash represent the characters for data selected in inverse cosine transformation.

The symbols +an −at the input lines to the adders 361 and 363 are addition/subtraction selection signals to instruct addition or subtraction for each clock during an eight-clock period. The eight symbols before the slash instruct addition or subtraction to be selected for discrete cosine transformation and those after the slash represent addition or subtraction to be selected for inverse cosine transformation.

The values above the adders 351 to 354 are multiplier selection signals to instruct which of the two coefficients is to be used for multiplication with the input for every clock during an eight-clock period. The eight values before the slash are for multiplier selection for discrete cosine transformation and those after the slash indicate the multipliers to be selected for inverse cosine transformation.

The value given at an input at each of the AND gates 380 and 386 represents the value of one-bit control signal (mask signal) input to the applicable signal line for every clock during an eight-clock period. The eight values before the slash represent control signals for discrete cosine transformation and those after the slash represent control signals for inverse cosine transformation.

Thus, the second embodiment of the present invention as described above enables a discrete cosine transformation processor with a simple hardware configuration as shown in the figure. This can obtain eight discrete cosine transformation coefficients or inverse discrete cosine transformation coefficients within a period of eight clocks.

Further, connection of two one-dimensional discrete cosine transformation processors according to the first and the second embodiments will provide a discrete cosine transformation processor to execute two-dimensional discrete cosine transformation processing.

As describe above, a discrete cosine transformation processor of the present invention has a plurality of addition/subtraction means and uses some of them for cosine transformation and the remaining ones for inverse cosine transformation, and calculates a plurality of cosine transformation coefficients by switching between different data selection modes at the selection means and between addition and subtraction at the addition/subtraction means, which results in small scale hardware capable of high-speed discrete cosine transformation processing.

Obviously, various modifications can be made to the above embodiments. It is intended to cover in the appended claims all such modifications and variations as fall within the true spirit and scope of the present invention.

What is claimed is:

1. A discrete cosine transformation processor to determine discrete cosine transformation coefficients and inverse cosine transformation coefficients based on input data comprising:
    a first addition/subtraction means to subject a plurality of input data arranged to certain combinations to addition or subtraction according to a first control signal every clock so as to output a plurality of combination input data,
    a plurality of selection means which receive the data from said first addition/subtraction means assigned to a plurality of groups according to certain combinations for data input group by group and output one of the combination input data according to a predetermined second control signal,
    a plurality of multiplication means which respectively receive a plurality of selected data selected by said selection means and multiply the selected data by the predetermined coefficients, and
    a plurality of second addition/subtraction means which perform addition or subtraction according to a third control signal every clock using the data output from said multiplication means with different combinations so as to determine cosine transformation coefficients or inverse cosine transformation coefficients.

2. A discrete cosine transformation processor of claim 1 wherein each of aid first, second and third control signals comprises two types of signals for cosine coefficient transformation and inverse cosine coefficient transformation and said first, second and third control signals being switchable for every clock.

3. A discrete cosine transformation processor to determine discrete cosine transformation coefficients and inverse cosine transformation coefficients based on input data comprising:
    eight first addition/subtraction means which perform addition or subtraction of eight input data with two combinations every clock according to a first control signal so as to output nine combination input data, eight selection means which receive the data from said first addition/subtraction means assigned to eight groups according to certain combinations for data input group by group and select one of the combination input data every clock according to a predetermined second control signal for output,
    seven multiplication means which respectively receive the data selected at said selection means and multiply the selected data by a predetermined coefficient every clock, and
    five second addition/subtraction means which perform addition or subtraction according to a third control signal using the data output from said multiplication means with different combinations every clock so as to determine cosine transformation coefficients or inverse cosine transformation coefficients.

4. A discrete cosine transformation processor of claim 3 wherein three of said five second addition/subtraction means are used for cosine transformation and the remaining two are used for inverse cosine transformation.

5. A discrete cosine transformation processor of claim 3 wherein said first control signal to specify addition or subtraction at said first addition/subtraction means, said second control signal for said selection signal and said third control signal to specify addition or subtraction at said second addition/subtraction means are given for each clock so that eight cosine transformation coefficients or inverse cosine coefficients are determined.

6. A discrete cosine transformation processor of claim 3 wherein each of said first, second and third control signals comprises two types of signals for cosine coefficient transformation and inverse cosine coefficient transformation and is switchable for every clock.

7. A discrete cosine transformation processor to determine discrete cosine transformation coefficients and inverse cosine transformation processor comprising:
    eight first addition/subtraction means which perform addition or subtraction of eight input data with two combinations every clock according to a first control signal so as to output eight combination input data, eight selection means which receive the data from said first addition/subtraction means assigned to four groups according to certain combinations for data input group by group and select one of the combination input data every clock according to a predetermined second control signal for output,
    four multiplication means with two types of coefficients which respectively receive the data selected at said selection means and multiply the selected data every clock by a coefficient specified by a third control signal, and
    five second addition/subtraction means which perform addition or subtraction according to a fourth control signal using the data output from said multiplication means with different combinations every clock so as to determine cosine transformation coefficients or inverse cosine transformation coefficients.

8. A discrete cosine transformation processor of claim 7 wherein two of said four second addition/subtraction means are used for cosine transformation and the remaining two are used for inverse transformation.

9. A discrete cosine transformation processor of claim 7 wherein the first control signal for said first addition/subtraction means, the second selection signal for said selection means, the third control signal to select either of the two coefficients at said predetermined coefficient multipliers and the fourth control signal to specify addition or subtraction at said addition/subtraction means are given for each clock so that eight cosine transformation coefficients or inverse cosine transformation coefficients are determined.

10. A discrete cosine transformation processor of claim 7 wherein each of said first, second, third and fourth control signals comprises two types of signals for cosine coefficient transformation and inverse cosine coefficient transformation and said first, second, third and fourth control signals being switchable for every clock.

* * * * *